7090X
S. Sawyer.
Stereotype Block.
No. 1
Patented May 28. 1832.
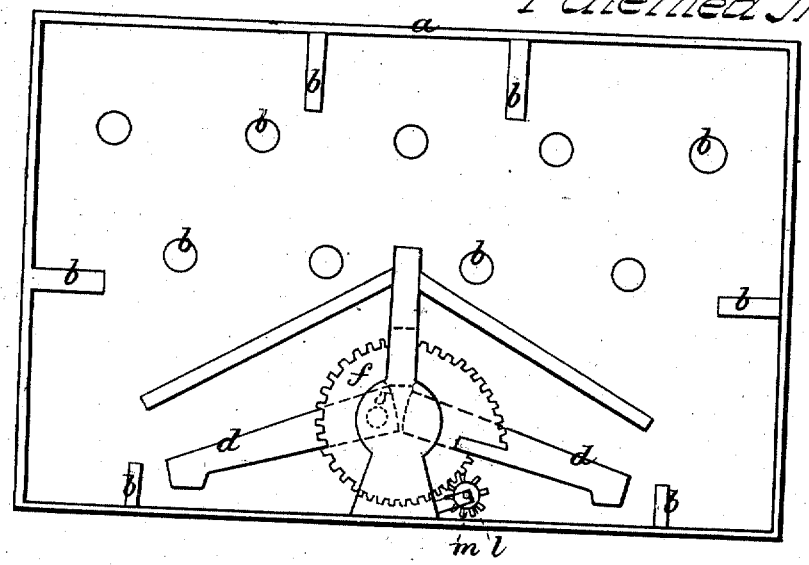
Fig. 3.
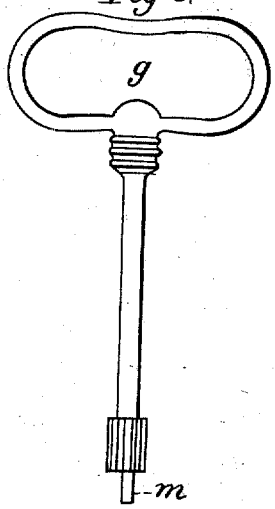
Fig. 3.
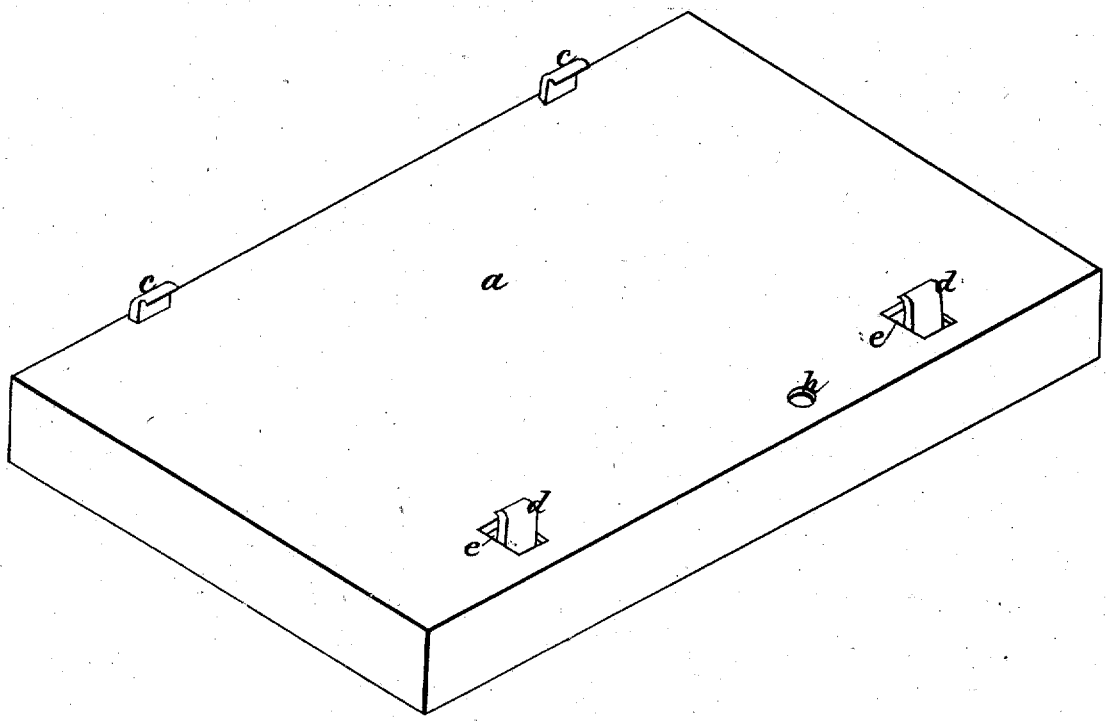

7090X May 28, 1832

Samuel Sawyer. A Citizen of

Letters Patent.

__The Schedule__ referred to in these __Letters Patent__ and making part of the same, containing a description in the words of the said Samuel Sawyer, himself of his improvement in the Metallic Stereotype Block to be used for the purpose of holding Stereotype plates in the process of printing.

Be it known that I Samuel Sawyer of Boston in the State of Massachusetts, have invented a New Metallic Stereotype or Block to be used for the purpose of holding Stereotype plates in the process of printing, and that the following is a full & exact Description of my said Invention. Instead of forming the Stereotype Block of wood in the usual way, I make it of Metal and generally cast in one piece, either of iron, brass, type metal or any other suitable metal or mixture of metals. Instead of being cast however they may be made of sheet metal in the manner of the iron boxes of common door locks. To support the face plate or that upon which the Stereotype plate is placed, I cast or otherwise affix within the block studs or partitions of metal sufficient in number for that purpose and extending down from the inside of the face plate so as to bear upon the bed when on the press
Upon one edge of the face of the block, I cast or otherwise affix permanent clasps or catches of the usual form for holding the plate and through openings in the face of the block at the opposite edge project the moveable clasps or catches.
These moveable catches which work through slots or mortises in the face plate are attached to, and make part of a Metallic plate placed within the block and sliding against the under side of the face plate. In order to force the catches against the edge of the stereotype plate, I employ an eccentric, or spiral wheel wheel, having on its periphery cogs or teeth which wheel is acted upon by a key passing through an opening in the edge of the face plate between two moveable catches. This key is furnished with teeth which taking into those on the edge of the eccentric, or spiral wheel, enables the operator to force up or retract the catches at pleasure. The principle upon which this eccentric or spiral wheel operates will be more clearly shown by a reference to the drawing thereof deposited in the Patent Office.

What I claim as my invention and for which I ask a Patent is the using of a Metallic stereotype block constructed in the manner herein described, and also the manner in which the moveable catches are operated upon by a key and an eccentric or spiral wheel as above set forth, whether the same may be made in the exact form represented, or in any other operating upon the same principle and producing the same effect.

Samuel Sawyer

Exd [illegible] Witnesses
[illegible] Samuel Blake
Thomas A. Dexter (496 words)